US010825148B2

(12) United States Patent
Tagra et al.

(10) Patent No.: US 10,825,148 B2
(45) Date of Patent: Nov. 3, 2020

(54) BOUNDARY-AWARE OBJECT REMOVAL AND CONTENT FILL

(71) Applicant: Adobe Inc., San Jose, CA (US)

(72) Inventors: Sanjeev Tagra, Haryana (IN); Ajay Jain, Ghaziabad UP (IN); Sachin Soni, New Delhi (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 93 days.

(21) Appl. No.: 16/204,226

(22) Filed: Nov. 29, 2018

(65) Prior Publication Data
US 2020/0175654 A1 Jun. 4, 2020

(51) Int. Cl.
G06K 9/46 (2006.01)
G06T 5/00 (2006.01)
G06T 5/50 (2006.01)
G06T 7/13 (2017.01)

(52) U.S. Cl.
CPC ............ *G06T 5/004* (2013.01); *G06T 5/50* (2013.01); *G06T 7/13* (2017.01); *G06T 2200/21* (2013.01); *G06T 2207/20081* (2013.01); *G06T 2207/20084* (2013.01); *G06T 2207/20221* (2013.01)

(58) Field of Classification Search
CPC combination set(s) only.
See application file for complete search history.

(56) References Cited

U.S. PATENT DOCUMENTS

| 10,080,012 | B2* | 9/2018 | McNamer | H04N 13/261 |
| 2008/0226123 | A1* | 9/2008 | Birtwistle | G06T 11/001 382/100 |
| 2009/0128548 | A1 | 5/2009 | Gloudemans et al. | |
| 2016/0063344 | A1* | 3/2016 | Fan | G06T 7/246 382/103 |
| 2017/0287137 | A1* | 10/2017 | Lin | G06N 3/08 |
| 2019/0094875 | A1 | 3/2019 | Schulter et al. | |
| 2019/0258878 | A1* | 8/2019 | Koivisto | G05D 1/00 |
| 2020/0026416 | A1* | 1/2020 | Bala | G06F 3/04845 |

(Continued)

OTHER PUBLICATIONS

Goodfellow, Ian J., et al., "Generative Adversarial Nets", arXiv:1406.2661v1, Jun. 10, 2014, 9 pages.

(Continued)

*Primary Examiner* — Cindy Trandai
(74) *Attorney, Agent, or Firm* — Kilpatrick Townsend & Stockton LLP

(57) ABSTRACT

Systems and methods for removing objects from images are disclosed. An image processing application identifies a boundary of each object of a set of objects in an image. In some cases, the identification uses deep learning. The image processing application identifies a completed boundary for each object of the set of objects by providing the object to a trained model. The image processing application determines a set of masks. Each mask corresponds to an object of the set of objects and represents a region of the image defined by an intersection of the boundary of the object and the boundary of a target object to be removed from the image. The image processing application updates each mask by separately performing content filling on the corresponding region. The image processing application creates an output image by merging each of the updated masks with portions of the image.

16 Claims, 7 Drawing Sheets

(56) References Cited

U.S. PATENT DOCUMENTS

2020/0134313 A1* 4/2020 Endoh ................. G06N 3/0454
2020/0160119 A1* 5/2020 Inakoshi ............. G06N 3/0454

OTHER PUBLICATIONS

Song, Yuhang, et al., SPG-Net: Segmentation Prediction and Guidance Network for Image Inpainting, arXiv: 1805.03356v4 [cs. CV] Aug. 6, 2018, 14 pages.

Criminisi, A., et al., "Region Filling and Object Removal by Exemplar-Based Image Inpainting", IEEE Transactions on Image Processing, vol. 13, No. 9, Sep. 2004, 13 pages.

Mate, Mrunal, et al., "Removing Unwanted Objects from an Image Using Image Inpainting", IJARIIE-ISSN(0)-2395-4396, vol. 1, Issue 4, 2015, 5 pages.

Criminisi, A. et al., "Object Removal by Exemplar-Based Inpainting", Microsoft Research Ltd., Cambridge, UK, 8 pages.

Nanavati, Nirali, et al., "Removal of Unwanted Objects Using Image Inpainting—A Technical Review", Journal of Engineering Research and Applications ISSN: 2248-9622, vol. 5, Issue 12. (Part-2) Dec. 2015, pp. 111-114, 4 pages.

Search and Examination Report from related GB Application GB1913340.4 dated Mar. 17, 2020, 6 pages.

* cited by examiner

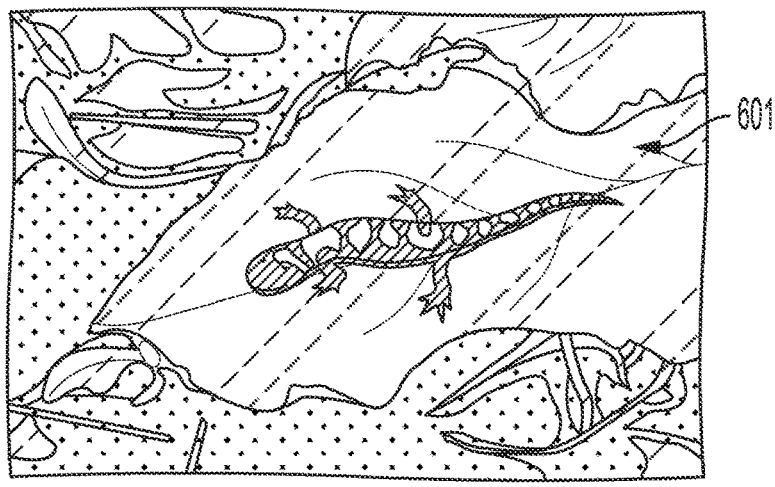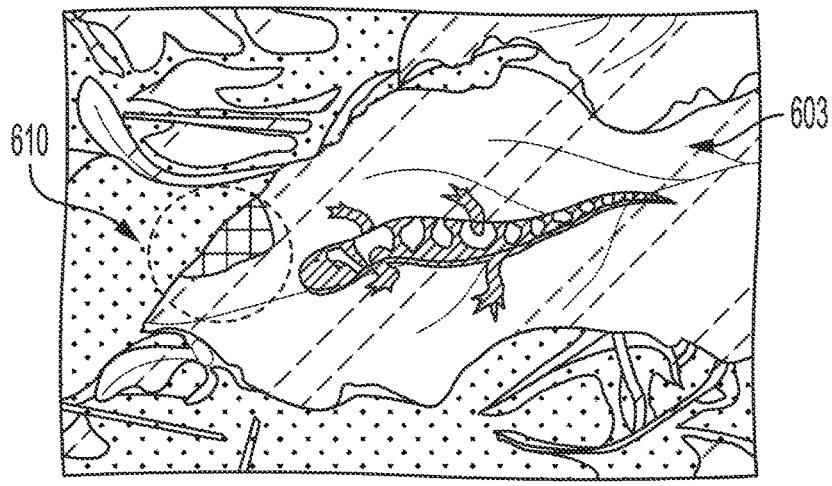
FIG. 6

BOUNDARY-AWARE OBJECT REMOVAL AND CONTENT FILL

TECHNICAL FIELD

This disclosure relates generally to removal of objects from digital images. More specifically, but not by way of limitation, this disclosure relates to removing objects from images by using object boundary detection in conjunction with content-aware fill.

BACKGROUND

During editing of an image such as a photo, a graphic designer may desire to remove a target object. For example, a designer may want to remove a toy that appears in the middle of a photo of a garden, or a yard sign from a photo of a house.

However, existing object removal software tools have deficiencies. For example, some solutions can only remove an object appearing in front of a plain background, because such solutions simply remove the unwanted region and automatically fill the resulting hole using samples from other parts of the image.

Other solutions improve this approach by more thoroughly analyzing the region around the hole to determine an appropriate fill for the missing content. But such solutions fail to determine the boundaries of an object that is obscured by the target object, resulting in inaccurate content filling. For example, such solutions cannot accurately recreate a leaf that is obscured by a ball, due to an inability to analyze the boundaries of the leaf and to recreate missing parts of the boundary. As a result, such solutions would fill the missing part of the leaf in a manner such that the leaf looks unrealistic.

Accordingly, solutions are needed for reliable and accurate object removal and filling.

SUMMARY

Systems and methods for removing objects from images are disclosed. An exemplary method accesses an image including a set of objects. The method identifies a completed boundary for each object of the set of objects by providing the object to a trained model. The method receives a selection of a target object that is to be removed from the objects. The method further determines a set of masks. Each mask corresponds to an object of the set of objects and represents a region of the image defined by an intersection of the boundary of the object and the boundary of the target object. The method updates each mask by separately performing content filling on the corresponding region. The method creates an output image by merging each of the updated masks with portions of the image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 6 depicts examples of training data used in FIG. 5, according to an embodiment of the present disclosure.

DETAILED DESCRIPTION

Figure 1:
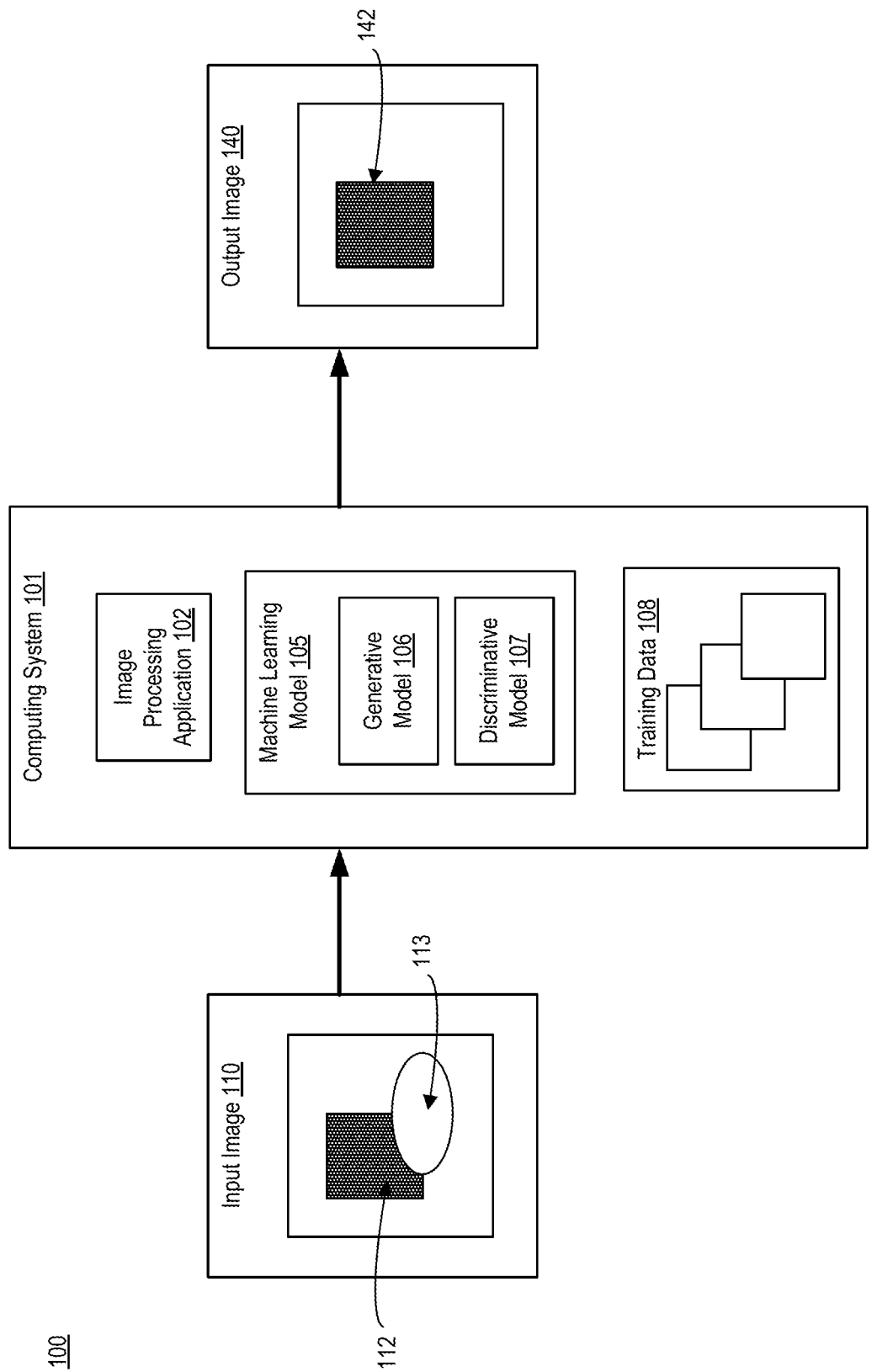
FIG. 1 is a diagram depicting an example of application components used for removing objects from images, according to an embodiment of the present disclosure.

As discussed above, existing solutions for removing objects suffer from deficiencies that include unrealistic content-filling of removed objects. In contrast, embodiments described herein facilitate more accurate object removal by using deep learning to detect boundaries of objects present in an input image, finding intersections between those objects, and applying content filling to each intersection. Consequently, disclosed solutions create a more aesthetically pleasing result because the boundaries of underlying objects are recreated and the removed objects are filled appropriately.

The following non-limiting example is introduced for discussion purposes. An image processing application executing on a computing device accesses a photographic image. The image depicts a garden table on a lawn and a wine bottle on the table. An upper region of the wine bottle obscures the lawn and a lower region of the wine bottle obscures the table. The application receives input from a graphic designer that the wine bottle should be removed from the image.

The image processing application identifies the objects within the image, specifically, the table, the lawn, and the wine bottle. The image processing application then identifies the boundaries, or contours, of the detected objects. In some cases, the deep learning such as conditional generative adversarial networks are used. Continuing the example, the application determines a first region, or mask, corresponding to an intersection, or an overlap, between the bottle and the lawn and a second region, or mask, corresponding to an overlap of the bottle and the table.

With each region detected, the image processing application fills in, or completes, the masks with content-aware filling, e.g., based on the content of the object on which the shape is based. Content aware filling involves recreating suitable content based on the existing content of an object to fill the empty space of a mask. For example, to fill-in the region of the lawn previously covered by the upper part of the wine bottle, the image processing application uses content from the rest of the lawn to intelligently complete the mask. The application fills the first mask without regard to the second mask, and vice versa. Once both the masks are filled, the application combines the regions into the output image, which is as the original without the wine bottle.

Disclosed solutions provide technical improvements in the field of image object removal. For example, certain embodiments use improved methods of generating training data for conditional generative adversarial networks and then use the trained networks to identify boundaries of obscured objects for which the complete boundary is not available. More specifically, an image processing application generates a set of robust training data that includes images depicting objects for which boundaries are known and modified images for which the boundaries have been artificially obscured. The conditional generative adversarial network is then trained this data set. By using the network, certain embodiments can complete missing boundaries of objects. Further, by applying content-aware filling to regions from different overlapping objects separately, embodiments provide more realistic object removal than previous solutions.

Additionally, disclosed solutions provide technical improvements over solutions that predict segmentation labels (e.g., type of objects present in the image) but fail to predict a boundary of each object in the image and determine each intersection between objects and the target object. In contrast, disclosed solutions predict a segmentation label of a missing area, thereby generating information about predicted object localization and shape details of the target object. Disclosed solutions can combine a segmentation mask with the input image to make a complete prediction. By guiding a segmentation process in this manner, disclosed solutions combine the strength of deep generative models with segmentation information, yielding more realistic predictions, especially for boundaries between different objects. Additionally, compared to previous solutions which can only make a single prediction given an input image, disclosed solutions provide interactive and multi-modal predictions.

As disclosed herein, "image" refers to an electronic representation of photos, images, text, user interface elements, and the like. Examples of images include Adobe® Photoshop® documents, Adobe® Illustrator® documents, or Adobe® InDesign® documents. An image can include one or more objects.

As disclosed herein, "object" refers to a discrete component of an image. Example objects include shapes, letters, text boxes, background objects, etc. Each object has a boundary.

As used herein, a "boundary" or "contour" of an object refers to an outer perimeter around the object. For example, a boundary around an orange might be a circle or near-circle. Boundaries of more complex objects may non-linear, for example, as is the case of a leaf or an animal.

As used herein, "region" or "mask" refers to a data structure that identifies or designates certain pixels of an image for a particular use. For example, a mask can identify pixels in a hole to be filled.

Turning now to the Figures, FIG. 1 is a diagram depicting an example of application components used for removing objects from images, according to an embodiment of the present disclosure. FIG. 1 depicts image processing environment 100, which includes input image 110, computing system 101, and output image 140. Computing system 101, an example of which is shown in further detail in FIG. 6, executes image processing application 102 and uses machine learning model 105.

Input image 110 includes a first object 112 (a square) and a second object 113 (an oval). As can be seen, object 113 partially obscures object 112 in the lower right corner of object 112. Because input image 110 can be a digitized photo or a rendered image that contains pixels, image processing application 102 determines objects 112 or 113 and their boundaries. Image processing application 102 then receives a designation of object 113 as a target object. In turn, image processing application 102 determines the boundaries of objects 112 and 113, determines an intersection between objects 112 and 113, and applies content filling to the intersection. As can be seen, output image 140 shows object 142, which corresponds to object 112.

Figure 2:
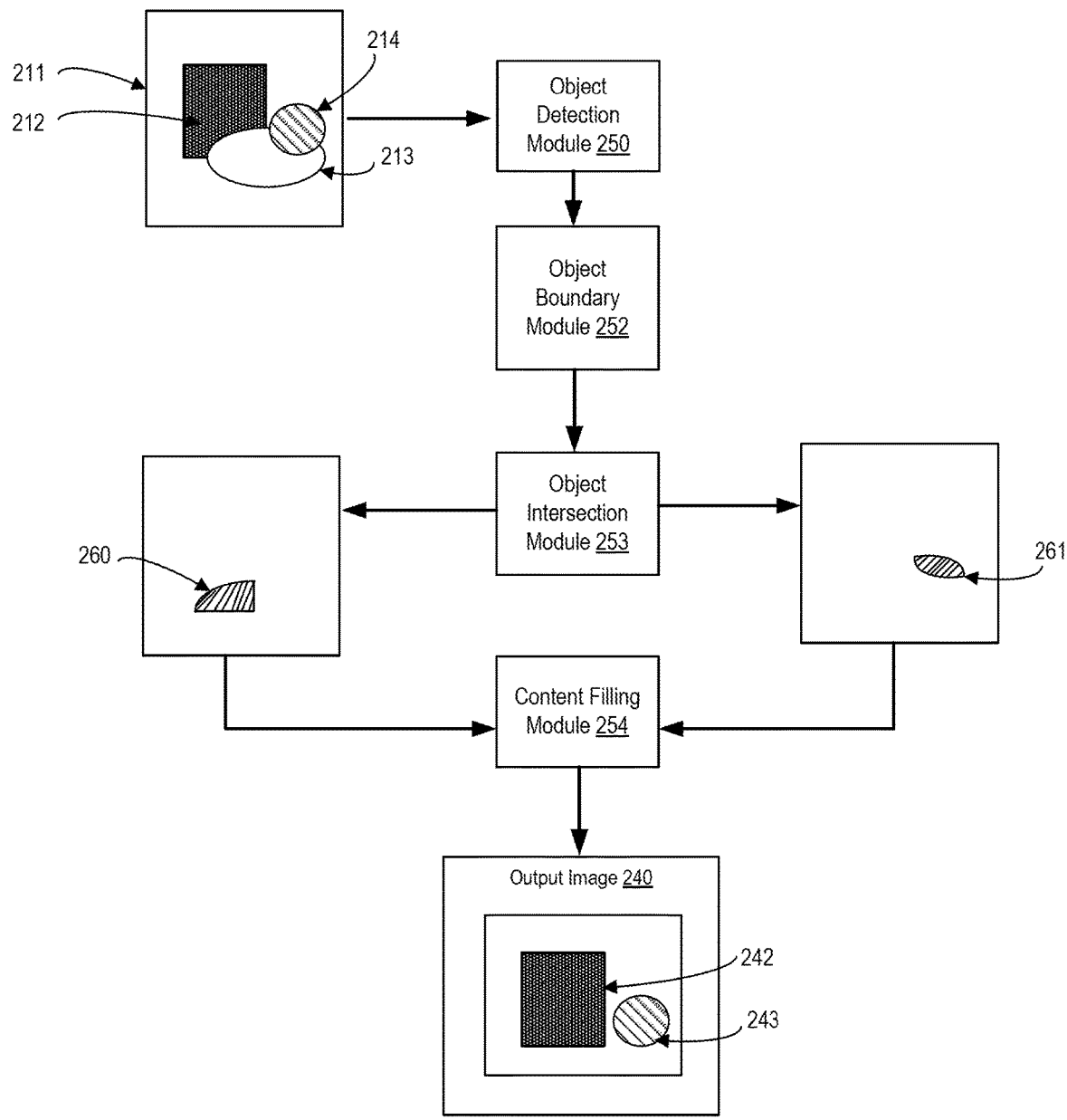
FIG. 2 depicts an example of a system implementation for removing objects from images, according to an embodiment of the present disclosure.

For input images with more objects, image processing application 102 identifies more masks and applies content filling separately to the corresponding object intersections. Image processing application 102 then merges the intersections, or masks, into output image 140. FIG. 2 depicts an additional example that includes more objects.

In some cases, image processing application 102 can use machine learning model 105 to perform one or more tasks. For example, as depicted, machine learning model 105 is a conditional generative adversarial model, which includes generative model 106 and discriminative model 107. Image processing application 102 can train generative model 106 and discriminative model 107 by using training data 108. An exemplary training process is discussed with respect to FIG. 5, but other processes can be used.

But different machine learning models can also be present in image processing environment 100. Other examples of suitable models employed by machine learning model 105 are predictive models, classification models, generative models, and discriminative models. Further, additional models can also be used by image processing application 102, e.g., to perform different tasks. For example, image processing application 102 can a first machine learning model to perform object detection and a second machine learning model to perform object boundary detection. Similarly, machine learning can be used to perform content-aware filling.

FIG. 2 depicts an example of a system implementation for removing objects from images according to an embodiment of the present disclosure. FIG. 2 depicts object removal environment 200, which includes object detection module 250, object boundary module 252, object intersection module 253, and content filling module 254. The modules are separated for example purposes; the functionality described herein can be implemented across any number of modules including by image processing application 102. Additionally, one or more modules can use machine learning capability.

Object removal environment 200 also depicts inputs and outputs at various stages. More specifically, object removal environment 200 includes input image 211, mask 260, mask 261, and output image 240. In some cases, image processing application 102 can output intermediate steps for debugging or for illustrative purposes.

Object detection module 250 receives input image 211, which includes object 212, object 213, and object 214. Object 213 is designated as the target object, or the object to be removed from input image 211. As can be seen, objects 213 intersects object 212 and object 214. Object boundary module 252 detects the boundaries of objects 212 and 213. Two objects are shown for example purposes. In the case that input image 211 includes more than two objects, object boundary module 252 determines a boundary for each additional object.

Object intersection module 253 determines whether object 212 or object 214 intersect with object 213. As depicted in input image 211, both object 212 and object 214 intersect object 213. Object intersection module 253 determine intersection of objects by analyzing vectors that represent objects 212-214. Object intersection module 253 outputs mask 260, representing the intersection between object 212 and object 213, and mask 261, representing the intersection between 214 and 213. In the case that input image 211 includes more than two objects that intersect with the target object, then additional intersections may be determined.

Content filling module 254 receives mask 261 and 262 and performs filling of the areas. As further discussed, different filling methods can be used such as content-aware fill. As can be seen, output image 240 includes object 242, corresponding to object 212 and object 243, corresponding to object 214. Objects 242 and 243 are filled and look substantially similar to as if the objects had been drawn without object 213 in front.

Figure 3:
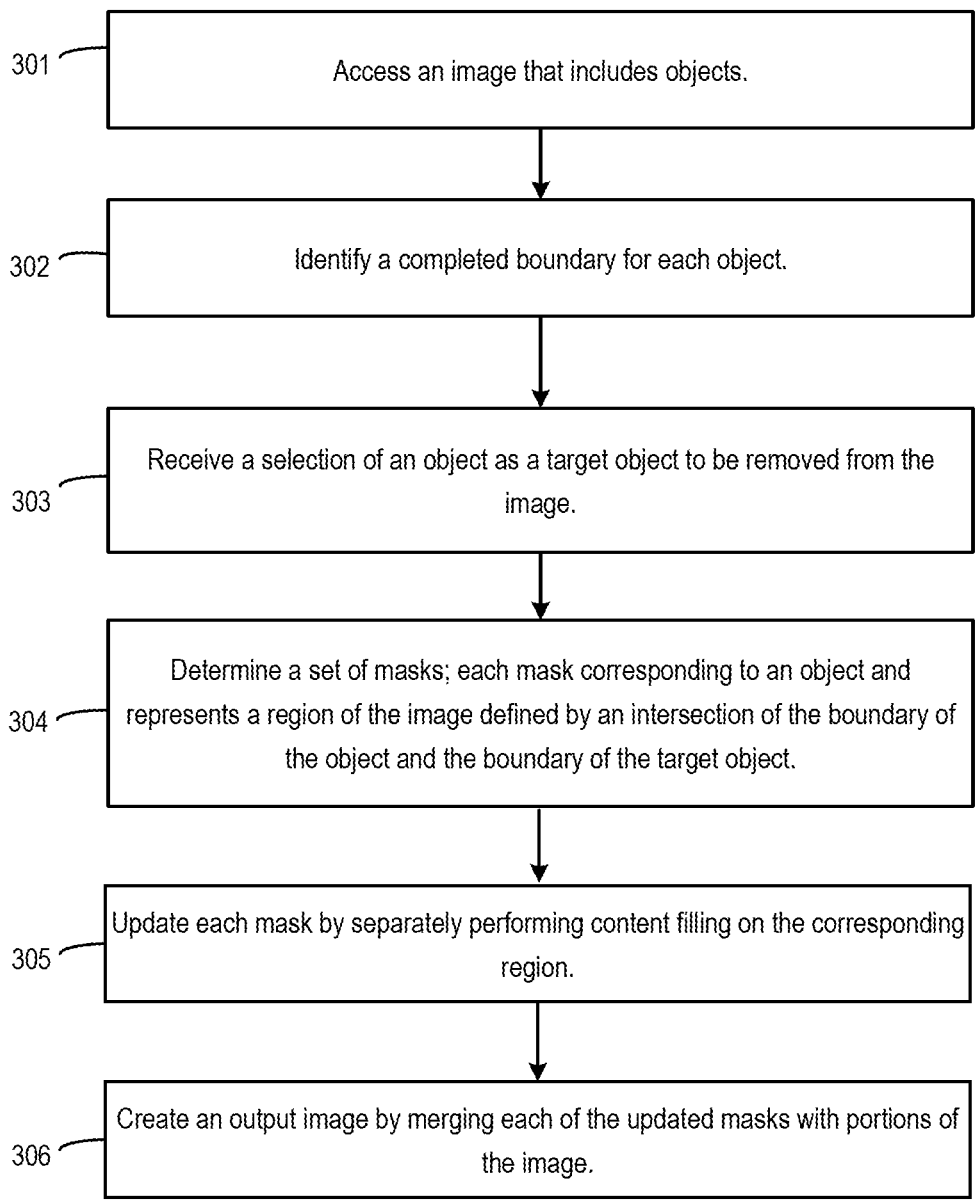
FIG. 3 depicts an example of a process for removing objects from images, according to an embodiment of the present disclosure.

FIG. 3 depicts an example of a process 300 for removing objects from images according to an embodiment of the present disclosure. Image processing application 102 can implement process 300 but other software applications and computing systems can implement process 300. For example purposes, FIG. 3 is discussed with respect to FIG. 4.

At block 301, process 300 involves accessing an image that includes objects. Image processing application 102 accesses an input image. Image processing application 102 can receive an input image from an external device or file. Alternatively, image processing application 102 can create the input image in response to user drawing commands.

Figure 4:
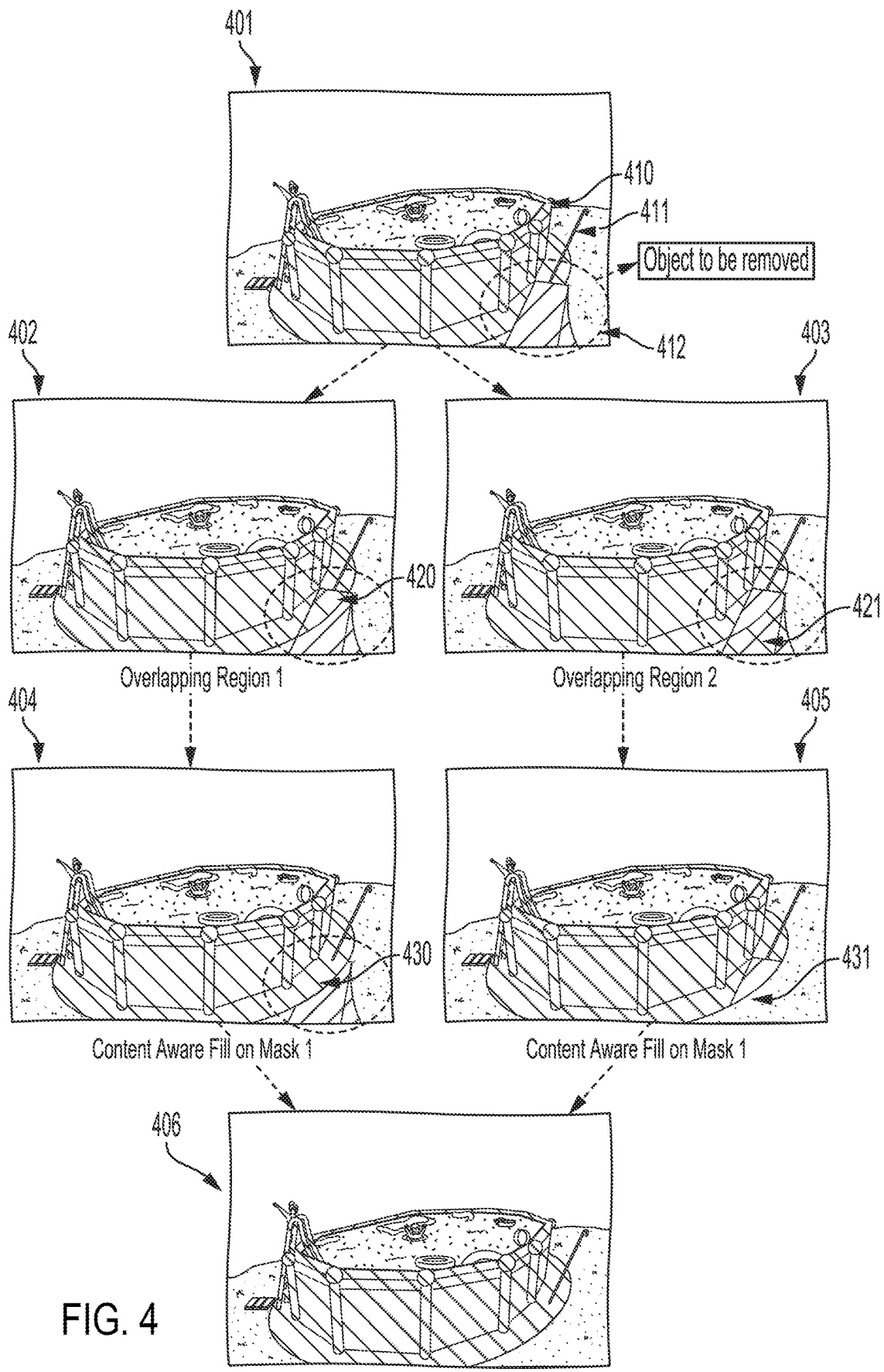
FIG. 4 depicts examples of intermediate results and final results of an object removal environment, according to an embodiment of the present disclosure.

FIG. 4 depicts examples of intermediate results and final results of an object removal environment, according to an embodiment of the present disclosure. FIG. 4 depicts input image 401, intersecting regions 402-403, filled images 404-405, and output image 406. At block 301, image processing application 102 accesses input image 401.

As can be seen, input image 401 depicts a swimming pool 410 located on grass 411, with a wooden object 412 that obscures part of swimming pool 410 and part of the grass 411. Image processing application 102 uses object detection module 250 to identify swimming pool 410 and grass 411. Different methods can be used for object identification. For example, machine learning model 105 be a trained classification model that can detect a presence of an image based on a training set of known images (e.g., objects, plants, animals, faces, cars, etc.). Additional methods for object identification include template matching, linear discriminant analysis (LDA), support vector machines (SVMs).

At block 302, process 300 involves identifying a completed boundary for each object. In some cases, image processing application 102 can use a trained conditional generative adversarial network to detect the boundaries of objects. More specifically, image processing application 102 provides each object to the model, and in turn, the model provides an output that represents the completed boundary of the object.

Some object boundaries may be completed (e.g. not obscured by another object). Other boundaries, such as the boundaries of objects that are obscured by the target object, may be incomplete. Image processing application 102 detects these boundaries.

Generative adversarial networks were first posited by Ian J. Goodfellow, et. al., "Generative Adversarial Networks," Departement d'informatique et de recherche operationelle, Universite de Montreal, 2014. Generative adversarial networks use a generator to generate new instances of data and a discriminator to evaluate whether those instances belong to the training data set or not.

Discriminative models attempt to classify input data. For example, a discriminative model can be trained to predict whether an email message is SPAM or not SPAM, or whether an image depicts a dog or not a dog. More specifically, discriminative models map features (detected in the input) to labels.

In contrast, generative models attempt to determine how a particular prediction is reached. For example, a generative model attempts to understand why a picture of a dog is classified as a dog. Instead of predicting a label given an input, generative models attempt to predict features that relate to a particular label (e.g., dog).

By using the trained model, boundaries of complicated shapes can be recreated. For example, while the boundary of a regular shape may be in some cases relatively simple to recreate (e.g. a linear completion), boundaries of other objects are more difficult to recreate. For example, a boundary of a leaf is incomplete because the boundary was obscured by the target object that is to be removed. By using a trained conditional generative adversarial network, image processing application 102 recreates the boundary of the leaf, which may be complicated and non-linear. An exemplary process for training a conditional adversarial network is described with respect to FIG. 5.

Continuing the example, image processing application 102 identifies a boundary for swimming pool 410 and grass 411.

At block 303, process 300 involves receiving a selection of an object as a target object to be removed as an image. Image processing application 102 can receive the selection of the target object from a user interface or from another input. Based on the identification of an object as the target object, image processing application 102 continues to block 304 to identify intersections between boundaries of other objects with the target object. Continuing the example, image processing application 102 receives an identification that wooden object 412 is the target object to be removed.

At block 304, process 300 involves determining a set of masks. Each mask can correspond to an object and represent a region of the image defined by an intersection of the boundary of the object and the boundary of the target object. Continuing the example, image processing application 102 identifies mask 420 (shown in image 402) and 421 (shown in image 403). More specifically, mask 420, corresponding to swimming pool 410, represents an intersection region between the swimming pool 410 and the wooden object 412. Mask 421, corresponding to grass 411, represents an intersecting region, between grass 411 and wooden object 412.

At block 305, process 300 involves updating the set of masks by separately performing content filling on the corresponding region. Different methods can be used for filling. In an example, image processing application 102 uses content-aware fill to fill the corresponding region, or hole, identified by each mask. Different types of content-aware filling are possible.

Generally, a content-aware filling algorithm seeks to approximately reconstruct the hole (the part represented by the mask) by rearranging and piecing together small, square patches of pixels from the remainder of the object that is present (e.g., a sampling region). More specifically, content aware filling identifies an approximate matching patch from the sampling region for the mask. Candidate patches from the object are selected, tested, and refined in an iterative manner. The resulting reconstruction can fill the area represented by the mask in the way that makes it look like the portion represented by the mask, e.g., the intersection between the particular object and the target object, was never obscured.

In some cases, this content-aware filling can be aware of object boundaries. For example, the content-aware filling approach can analyze area within the boundaries of the shape to be filled and not consider areas outside of the boundaries, which in some cases can yield better results.

In some cases, a patch-based synthesizer can be used to perform content filling. In an example, a first user input is received that specifies the hole in the original image to be filled; and a second user input indicating a sampling region of an original image from which pixels can be sampled, the sampling region excluding the hole. A constraint mask is used to store the sampling region and a patch-based synthesizer configured to synthesize the target image from patches sampled from the sampling region specified by the constraint mask.

For example, patch-based synthesizer can perform a patch synthesis using a randomized algorithm to generate and evaluate candidate patches and identify approximate nearest neighbor matches between image patches. To construct a given a target image (e.g., a hole) using image patches transformed from a source image, a data structure called a nearest neighbor field (NNF) can be used to manage mappings between patches in the source and target images. The NNF includes a transform for each pixel in the target image. The transforms may include similarity transforms. For a given pixel, the transform in the NNF for that pixel identifies a corresponding source patch which can be tested for similarity to a target patch associated with the pixel. The goal of patch-based synthesizer is to identify a source patch (e.g., from a valid sampling region) that best matches each target patch (i.e., the nearest neighbor). The NNF field can be updated during various stages of the synthesis process to keep track of the nearest neighbor source patch for each target patch.

The patch-based synthesizer can involve an iterative process of initialization, searching, voting and upscaling for each scale of a multi-scale solution. For example, for each target pixel from a target image (e.g., a hole), an initialization component assigns a randomly generated transform as an initialization. These transforms may include similarity transforms. Similarity transform parameters may be user-selected, pre-determined, some combination thereof, or otherwise. Generally, the randomly generated transforms are bounded over the applicable similarity transform parameters (e.g., translation, scale, rotation and/or mirror search domains). Sometimes, a patch validity component determines the validity of each candidate patch. For candidate source patches that fail the patch validity test, an initialization component assigns a new randomly generated transform to replace the failed candidate patch, and the patch validity test is repeated. If a patch validity test fails some predetermined amount of times (e.g., 256), a candidate patch may be generated by reducing the valid sampling region (e.g., dilating the hole), bounding the corresponding search domain or by using a randomly generated simple translation, rather than a full similarity transform. As such, this alternative technique can be utilized to generate a valid candidate patch.

Generally, the patch-based synthesizer performs searching to identify candidate patches that improve the NNF. A patch validity component determines the validity of each candidate patch. If a candidate source patch fails a patch validity test, the candidate patch is not utilized to improve the NNF. Candidate patches that pass patch validity are evaluated to determine whether a given candidate patch is a closer match for a particular target patch than an existing nearest neighbor in the NNF (e.g., whether a candidate patch reduces patch distance). In other words, NNF is a minimum of NNF and previous NNF.

In some embodiments, a propagation search component and random search component can identify candidate patches in a manner that facilitates a deterministic fill synthesis. In conventional techniques, a designated hole can be split up into several sub-divisions for parallel processing by different threads. In one example, a hole might be split up into three sub-divisions, and each of three threads processes a corresponding sub-division in parallel. In conventional techniques, a particular thread processes each pixel in an allocated sub-division in scanline order. For example, for a given pixel, propagation search component propagates solutions for neighboring pixels and selects the best solution, random search component identifies solutions for randomly identified pixels and selects the best solution, and the assigned thread moves onto the next pixel in scanline order. However, because some threads may finish generating a fill for an assigned sub-division faster than other threads, often times fills are generated for a sub-division using patches sampled from an incomplete fill for a neighboring sub-division.

In some embodiments, a designated hole can be split up into more sub-divisions than threads, and multiple threads can be allocated to only process non-bordering sub-divisions in parallel. In a simple example, assume a hole is split into six blocks, 0-5. For even iterations of patch-based synthesizer, three threads can process alternating blocks (e.g., 0, 2, 4) in scanline order. During odd iterations, the threads can process alternating blocks in reverse scanline order (e.g., 1, 3, 5). Because neighboring sub-divisions have completed fills by the time any thread finishes processing a particular sub-division, the timing by which each thread finishes processing its allocated sub-division does not matter. As such, allocating multiple threads to process non-bordering sub-divisions in parallel can produce deterministic results.

In other embodiments, a wavefront technique can be applied to identify candidate patches to facilitate a deterministic fill synthesis. Generally, wavefront processing is a technique for processing a multidimensional grid for which a particular unit in the grid depends upon other units in the grid. By starting in a corner, processing proceeds in a diagonal sweep across the grid which resembles a wavefront. In the context of a patch-based synthesis, searching can be implemented utilizing a wavefront instead of in scanline order (e.g., propagation search component can propagate solutions for a neighboring pixel above and for a neighboring pixel to the left). Further, a random number generator utilized by random search component to randomly identified pixels can be modified. Random number generators are usually designed to generate a known sequence of uniform numbers when given a seed. For wavefront processing to produce a deterministic patch synthesis, the accept x, y, patch-based synthesizer iteration and random search iteration as input to generate a uniform number. In this manner, for a given (x,y) pixel value, a given sequence of calls to the random number generator will produce the same results. In this manner, a deterministic set of candidate patches can be identified, facilitating a deterministic fill synthesis. Other variations will be understood by those of ordinary skill in the art.

Generally, patch-based synthesizer performs voting to generate a proposed target image. Generally, patch-voting is performed to accumulate the pixel colors of each intersecting neighbor patch, and the color votes are weighted averaged. The proposed target image can be passed to a user interface for presentation as a preview. As described above, during each subsequent iteration, the proposed target image is updated, and the updated target image can be passed to the front end for each iteration. The result is a gradually updating, live preview. These gradual updates can provide a user with quick, real-time feedback and an earlier opportunity to make any desired changes to arrive at a desired fill.

The patch-based synthesizer performs upscaling (e.g., via upscaling component to upscale the current NNF for use as a baseline during a subsequent iteration at the next scale. As this upscaling can produce invalid patches, a patch validity component advantageously determines the validity of candidate patches corresponding to the upscaled NNF. Candidate patches that pass patch validity are evaluated during a subsequent patch-based synthesizer iteration to determine whether a given candidate patch is a closer match for a particular target patch than a corresponding candidate patch generated from a randomly initialized NNF.

Generally, the flow through patch-based synthesizer is repeated for subsequent pyramid scales until a full resolution solution is generated and passed to the front end for presentation to a user. In some embodiments, patch-based synthesizer can break upon some component detecting an updated (e.g. by the user) sampling region and/or an applicable translation, scale, rotation and/or mirror search domain. In this scenario, patch-based synthesizer can salvage existing computations to improve speed and avoid unnecessary recomputations, as described in more detail above, and may automatically begin processing the updated sampling region and/or search domain. Additionally and/or alternatively, patch-based synthesizer can pass a proposed target image for presentation as a preview and break its process to facilitate a user input prior to completing the fill, as described in more detail above. A user indication to continue processing can trigger patch-based synthesizer to compute the remaining resolutions, as described in more detail above.

However, in some cases number of cases, holes filled by content-aware filling includes incorrect image content, producing an awkward and unnatural result. For example, by limiting candidate patches to two-dimensional translations, the potential quality of the reconstructed target image is limited. However, CAF techniques are already computationally expensive, and simply expanding the search domain results in an unacceptable increase in computation time.

Accordingly, in some cases, user input can be solicited. The interactive system includes a user interface which allows a user to specify a hole and a sampling region to use to fill the hole. The sampling region, which generally excludes the hole, can be stored in a constraint mask. A brush tool can facilitate a user input adding to or subtracting from the sampling region. Upon detecting completion of the user input, the interactive system can automatically pass the resulting constraint mask to a back end content-aware fill engine to synthesize a content-aware fill using the specified constraint mask.

Some embodiments can use improved patch validity tests for patch-based synthesis applications. The introduction of patch rotations and scaling increases the complexity of determining whether a candidate patch is a valid patch falling within the sampling region. To test the validity of a given patch comprising multiple pixels, one or more of a series of simplified tests can be performed to determine whether each pixel of the patch falls within the sampling region (e.g., designated by a constraint mask). A hole dilation test for patch validity can be performed by dilating the hole in the constraint mask to generate a reduced constraint mask, and by performing a lookup to determine whether a representative pixel in the patch falls within the region designated by the reduced constraint mask. A patch which passes this test is valid. A no-dilation test for patch invalidity can be performed by looking up whether a representative pixel of a patch falls within the hole (e.g., falls outside of the sampling region designated by the constraint mask). A patch which satisfies this criteria is invalid. A comprehensive pixel test for patch validity can be performed by looking up whether each pixel in the patch falls within the sampling region designated by the constraint mask. Due to the relatively larger computational demands of this comprehensive pixel test, sometimes, only those patches whose validity cannot be determined using either of the other two tests are tested with the comprehensive pixel test. A patch whose pixels pass the comprehensive test is valid. One or more of the patch validity tests can be incorporated into the interactive system for automatically synthesizing a content-aware fill.

For example, testing the validity of a patch can include using similarity transforms. a similarity transform is a shape-preserving transform that can include one or more translation, rotation, scaling or reflection (i.e., mirroring). More specifically an example method involves generating a similarity transformed candidate patch for reconstructing a target image, validating the candidate patch as a valid patch falling within a sampling region of the source image based on an evaluation of a representative pixel of the similarity transformed candidate patch, and automatically reconstructing the target image using the validated candidate patch. In some cases, the candidate patch includes pixels from a source image. In some cases, wherein validating the candidate patch includes executing a first patch validity test that includes dilating a hole in the sampling region to generate a reduced sampling region and validating the candidate patch based on performing a lookup to determine that the representative pixel falls within the reduced sampling region. In some cases, dilating the sampling region comprises adding a dilation strip with a width based on width of the candidate patch, allowed patch rotations, a maximum allowed scaling factor, and a super sampling rate.

Continuing the example, as can be seen in images 404-405, image processing application 102 has performed filling on regions 430 and 431. More specifically, region 430 depicts filling of the previously-obscured part of swimming pool 410 and region 431 depicts filling of the previously-obscured part of grass 411.

At block 306, process 300 involves creating an output image by merging each of the updated masks with portions of the image. The portions of the image are regions of the image that are not represented by any of the masks Image processing application 102 creates an output image by combining the filled images. Continuing the example, as can be seen in output image 406, image processing application 102 merges images 404 and 405, including regions 430 and 431, such that output image 406 represents a removal of the target object, wooden object 412.

Figure 5:
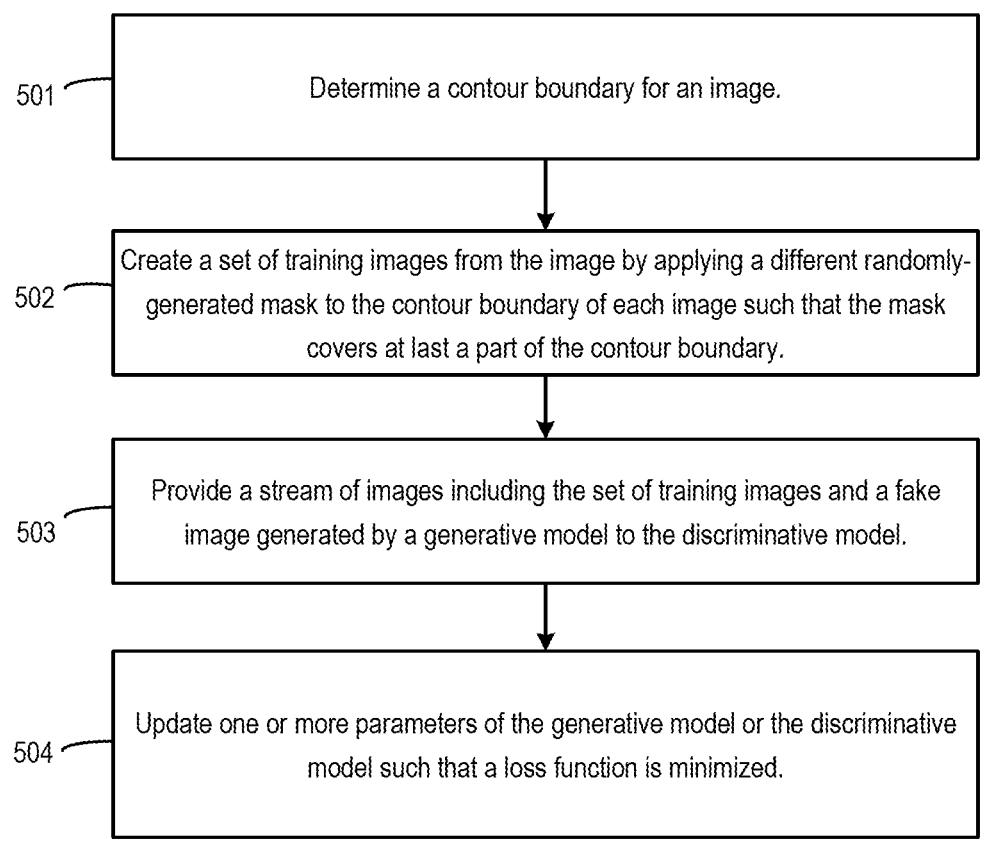
FIG. 5 depicts an example of a process for training a conditional generative adversarial network to detect boundaries of objects, according to an embodiment of the present disclosure.

As discussed, embodiments can use conditional generative adversarial networks to perform object boundary detection, e.g., as performed at block 302 of process 300. FIG. 5 shows an example of a process for training such a network.

FIG. 5 depicts an example of a process for training a conditional adversarial network to detect boundaries of objects, according to an embodiment of the present disclosure. Machine learning model 105 can be a conditional generative adversarial network that includes generative model 106 and discriminative model 107. Training a generative adversarial network involves simultaneously optimizing generative model 106 that captures a data distribution, and discriminative model 107 that estimates the probability that a sample comes from the training data rather than the generative network.

At block 501, process 500 involves determining a boundary for an object within an image. FIG. 5 is discussed with respect to FIG. 6 for example purposes, as FIG. 6 depicts an example training image. But other training images are possible.

FIG. 6 depicts examples of training data used in FIG. 5, according to an embodiment of the present disclosure. FIG. 6 depicts image 601, mask 602, and image 603. Image processing application 102 receives image 601 and determines the boundary for the objects in the image. Specifically, image processing application 102 determines the boundary for the leaf depicted, the lizard depicted, etc. Mask 602 depicts the determined boundaries.

At block 502, process 500 involves creating a set of training images by applying a different randomly-generated mask to the boundary of each image such that the mask covers at last a part of the boundary. Image processing application 102 randomly determines a mask that blacks out part of the leaf, as depicted by point 610 within image 603. In this manner, image processing application 102 forces the conditional generative adversarial network to predict the now-missing boundaries of the leaf. Blocks 501-502 repeat until such time that a sufficiently large training dataset is created. Different types of images can be used to deepen or broaden the training dataset. For example, multiple images of leaves with missing boundaries can be used to deepen the training set.

At block 503, process 500 involves providing a stream of images including the set of training images and a fake image generated by a generative model to the discriminative model. In some cases, image processing application 102 creates a stream of images that include the generated training images and one or more fake images generated by the generative model. During training, generative model 106 is pitted against an adversary: discriminative model 107. Generative model 106 can be thought of as analogous to a team of counterfeiters, trying to produce fake currency and use it without detection, while the discriminative model is analogous to the police, trying to detect the counterfeit currency. Competition in this game drives both teams to improve their methods until the counterfeits are indistinguishable from the genuine articles.

At block 504, process 500 involves updating one or more parameters of the generative model or the discriminative model such that a loss function is minimized. Both generative model 106 and discriminative model 107 can have one or more trainable parameters or weights. Generative adversarial networks are trained by updating one or more of these parameters. For example, image processing application 102 can simultaneously update a discriminative distribution so that it discriminates between samples from the data generating distribution from those of a generative distribution.

More specifically, image processing application 102 receives, from the discriminative model and for each image in the stream, an identification of a boundary in the image. In turn, image processing application 102 calculates the loss function based on a difference between the boundary and the reference boundary and updates parameters of the models accordingly. The discriminative model can identify that the fake image is not authentic and consequently does not update any parameters based on the fake image. Image processing application 102 can use trained machine learning model 105 to predict boundaries of objects in conjunction with process 300.

Figure 7:
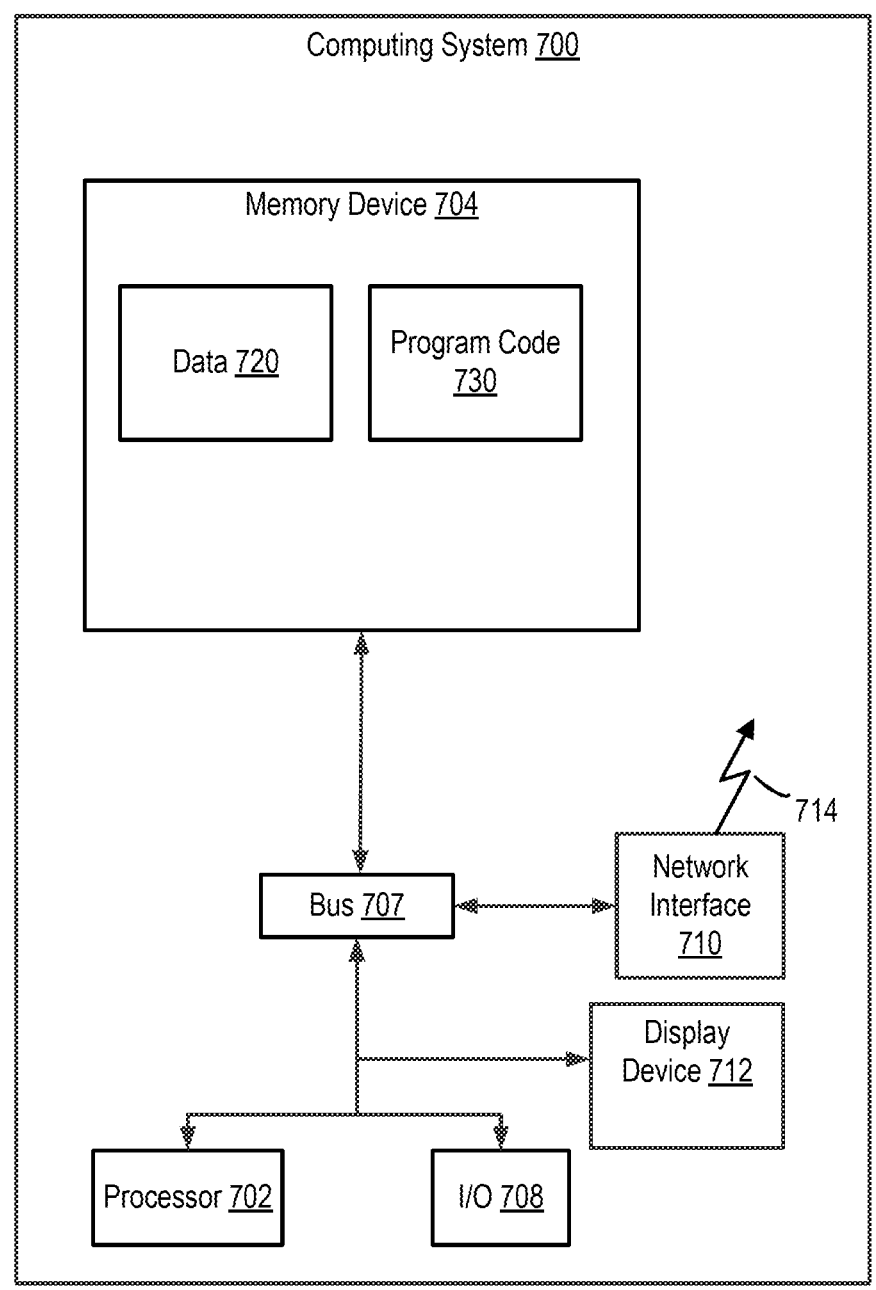
FIG. 7 depicts an example of a computing system for removing objects from images, according to an embodiment of the present disclosure.

FIG. 7 depicts an example of a computing system for removing objects from images, according to an embodiment of the present disclosure. Computing device 700 is an example of computing system 101 and can implement image processing application 102. Any suitable computing system may be used for performing the operations described herein. The depicted example of a computing device 700 includes a processor 702 communicatively coupled to one or more memory devices 704. The processor 702 executes computer-executable program code 730 stored in a memory device 704, accesses data 720 stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices or cores, including a single processing device. The functionality of the computing device may be implemented in hardware, software, firmware, or a combination thereof.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C #, Visual Basic, Java, or scripting language.

The computing device 700 may also include a number of external or internal devices, such as input or output devices. For example, the computing device 700 is shown with one or more input/output ("I/O") interfaces 708. An I/O interface 708 can receive input from input devices or provide output to output devices. One or more busses 707 are also included in the computing device 700. The bus 707 communicatively couples one or more components of a respective one of the computing device 700.

The computing device 700 executes program code 730 that configures the processor 702 to perform one or more of the operations described herein. For example, the program code 730 causes the processor to perform the operations described in FIG. 2 or 3.

The computing device 700 also includes a network interface device 710. The network interface device 710 includes any device or group of devices suitable for establishing a wired or wireless data connection to one or more data networks. The network interface device 710 may be a wireless device and have an antenna 714. The computing device 700 can communicate with one or more other computing devices implementing the computing device or other functionality via a data network using the network interface device 710.

The computing device 700 can also include a display device 712. Display device 712 can be a LCD, LED, touch-screen or other device operable to display information about the computing device 700. For example, information could include an operational status of the computing device, network status, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method of removing an object from an image, the method comprising:
   accessing an image comprising a plurality of objects;
   identifying a completed boundary for each object of the plurality of objects by providing each object to a trained adversarial network model;
   receiving a selection of a target object from the plurality of objects, the target object to be removed from the image;
   determining a set of masks, wherein each mask corresponds to a portion of an object of the plurality of objects and is defined by an intersection of the completed boundary of the corresponding object and the completed boundary of the target object;
   updating each mask in the set of masks by separately performing content filling on the corresponding portion of the corresponding object; and
   creating an output image by merging each of the updated masks with the corresponding object.

2. The method of claim 1, wherein portions of the image are regions of the image that are not represented by any of the masks in the set of masks.

3. The method of claim 1, wherein the trained adversarial network model is a conditional adversarial network.

4. The method of claim 1, wherein accessing the image further comprises detecting, in the image, the plurality of objects.

5. The method of claim 1, wherein the content filling comprises applying content-aware fill separately to each mask based on the corresponding object.

6. The method of claim 1, wherein creating the output image comprises creating a set of layers from the set of masks and merging each layer of the set of layers into the output image.

7. The method of claim 1, wherein performing the content filling comprises:
   dividing each mask into a plurality of segments;
   performing, on each segment, content aware fill; and
   combining each segment into the respective mask.

8. The method of claim 1, wherein performing the content filling
   comprises:
   generating a candidate patch that comprises pixels from the object that is represented by the mask;
   validating the candidate patch; and
   automatically reconstructing pixels of the mask using the validated candidate patch.

9. A system comprising:
   one or more processing devices; and
   a non-transitory computer-readable medium communicatively coupled to the one or more processing devices, wherein the one or more processing devices are configured to execute instructions and thereby perform operations comprising:
   accessing an image comprising a plurality of objects;
   identifying a completed boundary for each object of the plurality of objects by providing each object to a trained adversarial network model;
   receiving a selection of a target object from the plurality of objects, the target object to be removed from the image;
   determining a set of masks, wherein each mask corresponds to a portion of an object of the plurality of objects and is defined by an intersection of the completed boundary of the corresponding object and the completed boundary of the target object;
   updating each mask in the set of masks by separately performing content filling on the corresponding portion of the corresponding object; and
   creating an output image by merging each of the updated masks with the corresponding object.

10. The system of claim 9, wherein portions of the image are regions of the image that are not represented by any of the masks in the set of masks.

11. The system of claim 9, wherein the trained adversarial network model is a conditional adversarial network.

12. The system of claim 9, wherein accessing the image further comprises detecting, in the image, the plurality of objects.

13. The system of claim 9, wherein performing the content filling comprises applying content-aware fill separately to each mask based on the corresponding object.

14. The system of claim 9, wherein creating the output image comprises creating a set of layers from each of the masks and merging each layer of the set of layers into the output image.

15. The system of claim 9, wherein performing the content filling comprises:
   dividing each mask into a plurality of segments;
   performing, on each segment, content aware fill; and
   combining each segment into the respective mask.

16. The system of claim 9, wherein performing the content filling comprises:
   generating a candidate patch that comprises pixels from the object that is represented by the mask;
   validating the candidate patch; and
   automatically reconstructing pixels of the mask using the validated candidate patch.

\* \* \* \* \*